US009915344B2

(12) United States Patent
Takahashi

(10) Patent No.: US 9,915,344 B2
(45) Date of Patent: Mar. 13, 2018

(54) VEHICLE TRANSMISSION DEVICE

(71) Applicant: SUZUKI MOTOR CORPORATION, Hamamatsu-shi, Shizuoka (JP)

(72) Inventor: Hideaki Takahashi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 302 days.

(21) Appl. No.: 14/774,699

(22) PCT Filed: Apr. 7, 2015

(86) PCT No.: PCT/JP2015/060792
§ 371 (c)(1),
(2) Date: Sep. 10, 2015

(87) PCT Pub. No.: WO2015/156266
PCT Pub. Date: Oct. 15, 2015

(65) Prior Publication Data
US 2016/0123464 A1 May 5, 2016

(30) Foreign Application Priority Data
Apr. 10, 2014 (JP) ................................ 2014-081047

(51) Int. Cl.
F16H 3/08 (2006.01)
F16H 63/22 (2006.01)
(Continued)

(52) U.S. Cl.
CPC ........... *F16H 63/22* (2013.01); *F16H 37/043* (2013.01); *F16H 63/18* (2013.01); *F16H 63/30* (2013.01);
(Continued)

(58) Field of Classification Search
CPC ....................... F16H 37/021; F16H 2003/0931
(Continued)

(56) References Cited

U.S. PATENT DOCUMENTS 6,446,521 B1 9/2002 Hama et al. .................... 74/335
8,584,543 B2 * 11/2013 Gitt ......................... F16H 3/006
74/331
(Continued)

FOREIGN PATENT DOCUMENTS

JP 61-2953 A 1/1986
JP 61-189347 A 8/1986
(Continued)

OTHER PUBLICATIONS

Notification of Reasons for Refusal dated Sep. 13, 2017, issued by the Japanese Patent Office in corresponding application JP 2014-081047.
(Continued)

Primary Examiner — Ha Dinh Ho
(74) Attorney, Agent, or Firm — Stein IP, LLC

(57) ABSTRACT

The invention is to suppress the increase of axial lengths of each input shaft and each output shaft and increase the number of gear shift stages. A transmission device transmits a driving force of a crankshaft from a first transmission to a drive wheel side through a second transmission. The first transmission is provided with a first countershaft to which the driving force from the crankshaft is transmitted, and a first drive shaft to which the driving force of the first countershaft is transmitted. The second transmission is provided with a second countershaft to which the driving force of the first drive shaft is transmitted, and a second drive shaft to which the driving force of the second countershaft is transmitted and which transmits the driving force to the drive wheel side. The first and second transmissions are disposed side by side in a front/rear direction. Each of the first and second transmissions is set to have a plurality of gear shift stages.

5 Claims, 5 Drawing Sheets

(51) Int. Cl.
*F16H 63/18* (2006.01)
*F16H 37/04* (2006.01)
*F16H 63/30* (2006.01)
*F16H 63/20* (2006.01)

(52) U.S. Cl.
CPC .. *F16H 2037/045* (2013.01); *F16H 2063/202* (2013.01); *F16H 2200/006* (2013.01)

(58) Field of Classification Search
USPC ............................ 74/325, 330, 331, 333, 340
See application file for complete search history.

(56) References Cited

U.S. PATENT DOCUMENTS

| | | | | |
|---|---|---|---|---|
| 8,601,892 | B2* | 12/2013 | Pritchard | F16H 3/006 74/25 |
| 8,635,925 | B2* | 1/2014 | Gerlofs | F16H 61/16 74/329 |
| 8,720,291 | B2* | 5/2014 | Moufawad | F16H 3/74 475/170 |
| 2009/0165582 | A1 | 7/2009 | Tsunashima et al. | 74/331 |
| 2013/0239719 | A1* | 9/2013 | Sasada | F16H 3/093 74/359 |
| 2014/0038769 | A1* | 2/2014 | Kaltenbach | F16H 37/042 475/302 |
| 2015/0147556 | A1 | 5/2015 | Sasaki et al. | |

FOREIGN PATENT DOCUMENTS

| | | |
|---|---|---|
| JP | 4-19947 U | 2/1992 |
| JP | 8-1251 B2 | 1/1996 |
| JP | 2001-132839 A | 5/2001 |
| JP | 2009-156375 A | 7/2009 |
| JP | 2015-127392 A | 7/2015 |

OTHER PUBLICATIONS

International Search Report dated Jun. 16, 2015, issued by the Japanese Patent Office in corresponding application PCT/JP2015/060792.

Written Opinion of the International Searching Authority dated Jun. 16, 2015, issued by the Japanese Patent Office in corresponding application PCT/JP2015/060792.

* cited by examiner

VEHICLE TRANSMISSION DEVICE

CROSS-REFERENCE TO RELATED APPLICATIONS

This application is a national stage of International Application No. PCT/JP2015/060792, filed Apr. 7, 2015, which claims the benefit of priority to Japanese Application No. 2014-081047, filed Apr. 10, 2014, in the Japanese Patent Office, the disclosures of which are incorporated herein by reference.

TECHNICAL FIELD

The present invention relates to a vehicle transmission device which transmits a driving force from a crankshaft through gears.

BACKGROUND ART

An engine mounted in a vehicle such as a motorcycle is provided with a transmission device which transmits a driving force of a crankshaft to a drive wheel side through a clutch mechanism. The transmission device is provided with a countershaft (input shaft) and a drive shaft (output shaft) which extend in parallel with a vehicle width direction, and transmission gears which are mounted on each of the shafts. The transmission device changes a combination of transmission gears engaged with each other to thereby perform transmission. In such a transmission device, the number of gear shift stages is often set at 6 as disclosed in Patent Literature 1.

On the other hand, as disclosed in Patent Literature 2, a sub transmission is used additionally to a normal transmission in a vehicle for travelling on an uneven ground (e.g. a four-wheeled buggy) in order to expand the range of a transmission gear ratio. In Patent Literature 2, two drive shafts are provided in the normal transmission and the sub transmission. Gears engaged with each other are provided on the respective drive shafts to thereby perform sub transmission.

PRIOR ART LITERATURES

Patent Literature

Patent Literature 1: JP-A-2005-127392
Patent Literature 2: JP-A-61-189347

SUMMARY OF INVENTION

Problem to be Solved by the Invention

It is considered that the number of stages in the transmission device will increase in the future in order to improve fuel efficiency etc. However, when the number of stages is increased in the structure in Patent Literature 1, the number of mission gears mounted in each shaft increases correspondingly to the increased number of stages. Therefore, there is a problem that the axial length of each shaft may increase in a vehicle width direction. Hence, there is also a problem that overhanging of a clutch mechanism etc. with respect to an engine center in the same direction may increase. Further, the distance between bearings supporting the shaft increases. Therefore, there also arises a problem from the viewpoint of the strength of each of the shafts, such as a problem that an amount of deflection deformation in the shaft may increase.

Also in the structure in Patent Literature 2, the axial length of each drive shaft is extended so that the gears for the sub transmission can be mounted on the drive shaft. Accordingly, there occurs the same problem as that in Patent Literature 1 because the axial length of the drive shaft is longer.

The invention has been accomplished in consideration of the aforementioned points. An object of the invention is to provide a vehicle transmission device in which the increase of the axial length of each of input shafts and output shafts can be suppressed and the number of gear shift stages can be increased.

Means for Solving the Problem

A vehicle transmission device of the invention transmits a driving force of a crankshaft from a first transmission to a drive wheel side through a second transmission, wherein: the first transmission includes a first input shaft to which the driving force from the crankshaft is transmitted, and a first output shaft to which the driving force of the first input shaft is transmitted through one of first transmission gears; the second transmission includes a second input shaft to which the driving force of the first output shaft is transmitted through a transmission mechanism, and a second output shaft to which the driving force of the second input shaft is transmitted through one of second transmission gears and which transmits the driving force to the drive wheel side; and the first and second transmissions are disposed side by side in a front/rear direction and each of the first and second transmissions is set to have a plurality of gear shift stages.

According to the configuration, the second transmission is provided additionally to the first transmission and gear shift can be performed in a plurality of stages in each of the transmissions. Accordingly, the number of stages in the transmission device can be increased without extending the vehicle width direction lengths of the input shaft and the output shaft in each of the transmissions. When, for example, four first transmission gears are provided on each of the first input shaft and the first output shaft to perform gear shift in 4 stages and two second transmission gears are provided on each of the second input shaft and the second output shaft to perform gear shift in two stages, the total number of gear shift stages in the transmission device can be set at 8 (=4×2). Thus, the axial length can be shortened, and at the same time, the number of stages in the transmission device can be increased, in comparison with the 6-speed transmission device according to the background art. As a result, the mass of the transmission device can be concentrated on the engine center in the vehicle width direction so that kinetic performance of the vehicle can be prevented from being spoiled. In addition, the distance between bearings supporting each of the shafts is not increased but deterioration of strength of each shaft can be prevented.

In the vehicle transmission device of the invention, it is preferable that: the first and second transmissions are provided with slide dogs respectively, and the slide dogs are selectively connected to one of the first transmission gears and one of the second transmission gears so that the driving force can be transmitted by the connected first and second transmission gears; and a single shift mechanism is provided in a position adjacent to the first and second transmissions, and the shift mechanism is provided to be able to simultaneously shift the first and second transmission gears which transmit the driving force. According to the configuration, the configuration can be simplified in comparison with a configuration which includes shift mechanisms provided respectively in the first and second transmissions. In addition, the single shift mechanism is operated to shift the transmission gears of both the first and second transmissions simultaneously. Accordingly, operability can be improved.

In the vehicle transmission device of the invention, it is preferable that the shift mechanism includes a single shift cam in which a plurality of lead grooves are formed in its outer circumference and which is rotated to displace the respective lead grooves so that the first and second transmission gears to which the respective slide dogs are connected can be shifted due to the displacement. According to the configuration, the configuration of the shift mechanism can be simplified due to the single shift cam having the plurality of lead grooves formed therein, even when the number of gear shift stages is increased.

In the vehicle transmission device of the invention, it is preferable that the first input shaft is disposed above the first output shaft, the second output shaft is disposed above the second input shaft, and the first input shaft and the second output shaft are disposed side by side in the front/rear direction. According to the configuration, the two input shafts and the two output shafts are arranged side by side in the front/rear direction and the up/down direction so that these shafts can be disposed densely. Accordingly, the transmission device as a whole can be miniaturized.

In the vehicle transmission device of the invention, it is preferable that when the crankshaft, the first input shaft and the second output shaft are seen in their extension directions, center positions of the crankshaft, the first input shaft and the second output shaft are disposed along substantially the same straight line. According to the configuration, the layout in the transmission device can be designed easily.

Advantageous Effects of Invention

According to the vehicle transmission device according to the invention, the second transmission is provided additionally to the first transmission so that gear shift can be performed in a plurality of stages in each of the transmissions. Accordingly, the number of gear shift stages can be increased while the increase of the axial lengths of each input shaft and each output shaft can be suppressed.

MODE FOR CARRYING OUT THE INVENTION

Figure 1:
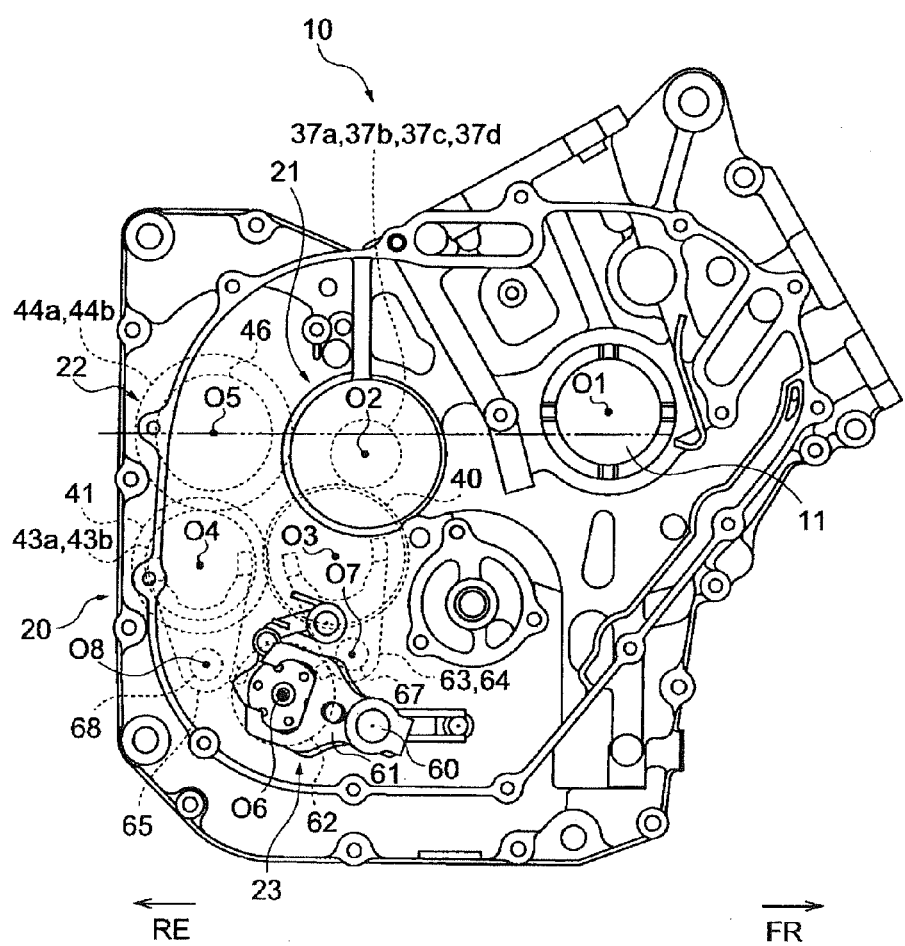
FIG. 1 A right side view of a crankcase provided with a vehicle transmission device according to an embodiment of the invention.
Figure 2:
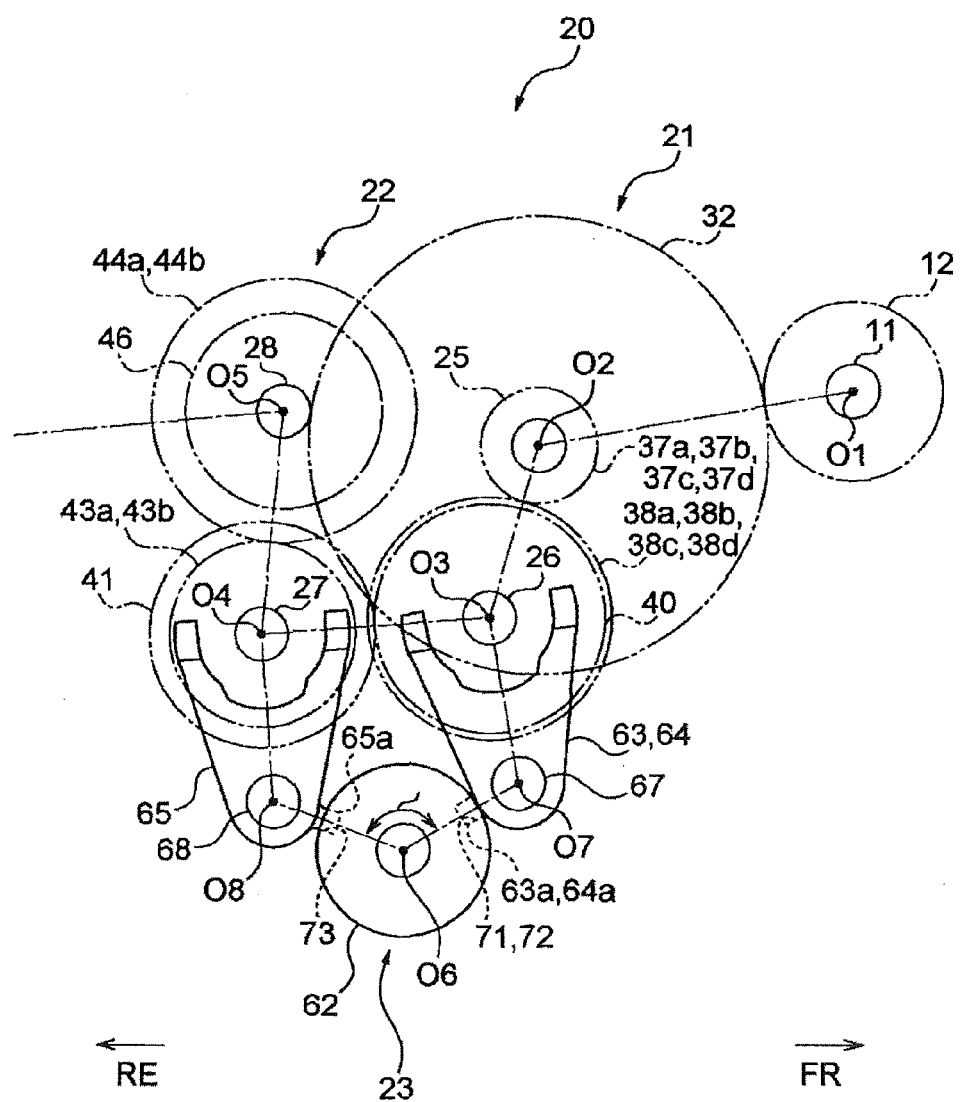
FIG. 2 A conceptual view in which a part of the configuration in FIG. 1 has been omitted and simplified.

An embodiment of the invention will be described below in detail with reference to the accompanying drawings. Although an example in which a vehicle transmission device according to the invention is applied to a motorcycle will be described below, the subject to which the vehicle transmission device according to the invention is applied is not limited thereto but may be changed. For example, the vehicle transmission device according to the invention may be applied to a four-wheeled vehicle, an outboard motor, etc. The vehicle transmission device will be described with reference to FIG. 1 and FIG. 2. FIG. 1 is a right side view of a crankcase provided with the vehicle transmission device. FIG. 2 is a conceptual view in which a part of the configuration in FIG. 1 has been omitted and simplified. Incidentally, in the following drawings, the front of a vehicle body is designated by an arrow FR; the rear of the vehicle body, an arrow RE; a left side of the vehicle body, an arrow L; a right side of the vehicle body, an arrow R; and a vehicle width direction, an arrow W.

As shown in FIG. 1, a crankshaft 11 is disposed in the front inside a crankcase 10. A rotation shaft of the crankshaft 11 is disposed in parallel with the vehicle width direction (direction perpendicular to the paper plane in FIG. 1). In addition, a transmission device 20 is disposed in the rear inside the crankcase 10. Also as shown in FIG. 2, the transmission device 20 has a configuration including a first transmission 21, a second transmission 22, and a single shift mechanism 23. The first transmission 21 is disposed at the rear of the crankshaft 11. The second transmission 22 is disposed adjacently to the rear of the first transmission 21 and side by side with the first transmission 21 in a front/rear direction. The single shift mechanism 23 is disposed in an adjacent position under the first and second transmissions 21 and 22.

Figure 3:
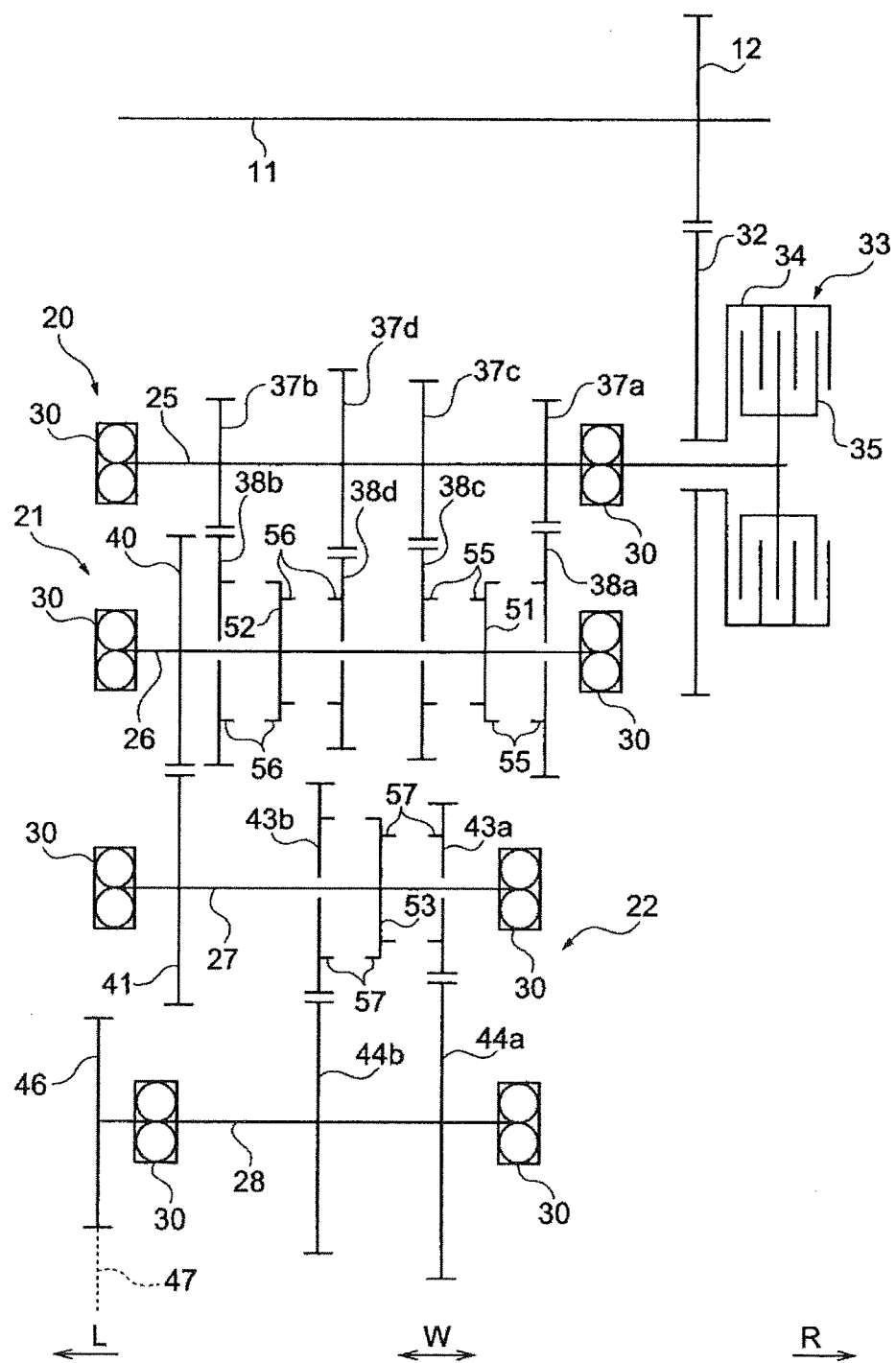
FIG. 3 A simplified sectional view cut along a plane passing through O1, O2, O3, O4 and O5 in FIG. 2.

FIG. 3 is a simplified sectional view cut along a plane passing through points O1, O2, O3, O4 and O5 in FIG. 2. As shown in FIG. 3, a primary drive gear 12 is provided on one end (right end) of the crankshaft 11 so as to be rotatable integrally therewith. The first transmission 21 has a first countershaft (first input shaft) 25 and a first drive shaft (first output shaft) 26. The second transmission 22 has a second countershaft (second input shaft) 27 and a second drive shaft (second output shaft) 28. The respective shafts 25 to 28 are disposed in parallel with the vehicle width direction similarly to the crankshaft 11. Opposite end sides of the respective shafts 25 to 28 are supported rotatably in the crankcase 10 (see FIG. 1) through bearings 30.

Here, return to FIG. 1 and FIG. 2. The points O1 to O5 designate positions of shaft centers of the crankshaft 11, the first countershaft 25, the first drive shaft 26, the second countershaft 27 and the second drive shaft 28. When the center O1 of the crankshaft 11, the center O2 of the first countershaft 25, and the center O5 of the second drive shaft 28 are seen in their extension directions (when the transmission device 20 is seen in side view), the positions of the respective centers O1, O2 and O5 are disposed along substantially the same straight line designated by a two-dot chain line in FIG. 1. Thus, the layout of the shafts 11, 25 and 28 can be simplified. In addition, the first countershaft 25 is disposed above the first drive shaft 26, and the second drive shaft 28 is disposed above the second countershaft 27. The first countershaft 25 and the second drive shaft 28 are disposed side by side in the front/rear direction. Thus, the four shafts 25 to 28 are arranged densely in the front/rear direction and an up/down direction so that the transmission device 20 can be miniaturized in the same directions.

Return to FIG. 3. A primary driven gear 32 engaged with the primary drive gear 12 is provided rotatably on the first countershaft 25. An input-side outer case (clutch housing) 34 of a clutch mechanism 33 is fixed to the primary driven gear 32 so as to be rotatable integrally therewith. On the other hand, an output-side inner hub 35 of the clutch mechanism 33 is fixed to one end side of the first countershaft 25. The outer case 34 and the inner hub 35 are connected to each other through a large number of friction plates so as to be operable intermittently. Thus, a driving force from the crankshaft 11 can be transmitted to the first countershaft 25 through the clutch mechanism 33.

The first transmission 21 is further provided with four first input-side transmission gears (first transmission gears) which have different numbers of teeth from one another and which are provided on the first countershaft 25. As the first input-side transmission gears, a first input-side first speed gear 37a, a first input-side third speed gear 37c, a first input-side fourth speed gear 37d, and a first input-side second speed gear 37b are arranged in the named order from the right. In addition, meshing pitch circle radii of the first input-side first speed gear 37a, the first input-side second speed gear 37b, the first input-side third speed gear 37c and the first input-side fourth speed gear 37d increase in the named order. These gears 37a to 37d are spline-fitted on or molded integrally with the first countershaft 25 so as to be rotated integrally with the first countershaft 25. In addition, these gears 37a to 37d are fixed to the first countershaft 25 so as to be able to move axially.

The first transmission 21 is further provided with four first output-side transmission gears (first transmission gears) which have different numbers of teeth from one another and which are provided on the first drive shaft 26. As the first output-side transmission gears, a first output-side first speed gear 38a, a first output-side third speed gear 38c, a first output-side fourth speed gear 38d, and a first output-side second speed gear 38b are arranged in the named order from the right. In addition, meshing pitch circle radii of the first output-side first speed gear 38a, the first output-side second speed gear 38b, the first output-side third speed gear 38c and the first output-side fourth speed gear 38d decrease in the named order. These gears 38a to 38d are provided rotatably on the first drive shaft 26 so as to be able to run idle. In addition, the gears 38a to 38d are mounted on the first drive shaft 26 so as to be unable to move axially. The first output-side gears 38a to 38d are always engaged with the first input-side gears 37a to 37d respectively.

A reduction drive gear 40 is fixed to one end (left end) side of the first drive shaft 26 so as to be rotated integrally therewith. On the other hand, a reduction driven gear 41 is fixed to one end (left end) side of the second countershaft 27 so as to be rotated integrally therewith. The reduction drive gear 40 and the reduction driven gear 41 are engaged with each other so that a driving force of the first drive shaft 26 can be transmitted to the second countershaft 27 through these gears 40 and 41. Here, the reduction drive gear 40 and the reduction driven gear 41 constitute a transmission mechanism.

The second transmission 22 is further provided with two second input-side transmission gears (second transmission gears) which have different numbers of teeth from each other and which are provided on the second countershaft 27. As the second input-side transmission gears, a second input-side first speed gear 43a and a second input-side second speed gear 43b are arranged in the named order from the right. These gears 43a and 43b are provided rotatably on the second countershaft 27 so as to be able to run idle. In addition, these gears 43a and 43b are mounted on the second countershaft 27 so as to be unable to move axially.

The second transmission 22 is further provided with two second output-side transmission gears (second transmission gears) which have different numbers of teeth from each other and which are provided on the second drive shaft 28. As the second output-side transmission gears, a second output-side first speed gear 44a and a second output-side second speed gear 44b are arranged in the named order from the right. These gears 44a and 44b are spline-fitted on or molded integrally with the second drive shaft 28 so as to be rotated integrally with the second drive shaft 28. In addition, these gears 44a and 44b are fixed to the second drive shaft 28 so as to be unable to move axially. The second output-side gears 44a and 44b are always engaged with the input-side gears 43a and 43b respectively.

A drive sprocket 46 is provided at one end (left end) of the second drive shaft 28. The drive sprocket 46 is connected to a driven sprocket (not shown) provided on a drive wheel (not shown) through a drive chain 47 so that a driving force of the second drive shaft 28 can be transmitted to the drive wheel side by the chain driving.

Here, first and second slide dogs 51 and 52 are provided on the first drive shaft 26. A third slide dog 53 is provided on the second countershaft 27. The first slide dog 51 is arranged between the first output-side first speed gear 38a and the first output-side third speed gear 38c. The second slide dog 52 is arranged between the first output-side fourth speed gear 38d and the first outputs-side second speed gear 38b. The first and second slide dogs 51 and 52 are spline-fitted on the first drive shaft 26 so as to be rotated integrally with the first drive shaft 26. In addition, the first and second slide dogs 51 and 52 are mounted on the first drive shaft 26 so as to be able to move axially. Dog clutches 55 engaged with each other by concave parts, convex parts, etc. are molded integrally with side surfaces of the first slide dog 51 and side surfaces of the first output-side first speed gear 38a and the first output-side third speed gear 38c. In addition, dog clutches 56 similar to the aforementioned ones are also molded integrally with side surfaces of the second slide dog 52 and side surfaces of the first output-side fourth speed gear 38d and the first output-side second speed gear 38b. A driving force from the first countershaft 25 can be transmitted through one of the gears 38a to 38d with which the dog clutches 55 or 56 of the first or second slide dog 51 or 52 are engaged in the first drive shaft 26, and through a corresponding one of the first input-side transmission gears 37a to 37d with which the gear 38a, 38b, 38c or 38d is engaged.

A third slide dog 53 is provided between the second input-side first speed gear 43a and the second input-side second speed gear 43b in the second countershaft 27. The third slide dog 53 is spline-fitted on the second countershaft 27 so as to be rotated integrally with the second countershaft 27. In addition, the third slide dog 53 is mounted on the second countershaft 27 so as to be able to move axially. Dog clutches 57 similar to the aforementioned ones are also molded integrally with side surfaces of the third slide dog 53 and side surfaces of the second input-side first speed gear 43a and the second input-side second speed gear 43b. A driving force can be transmitted to the second drive shaft 28 through one of the gears 43a and 43b with which the dog clutches 57 of the third slide dog 53 are engaged in the second countershaft 27 and through a corresponding one of the second output-side transmission gears 44a and 44b with which the gear 43a or 43b is engaged.

Figure 4:
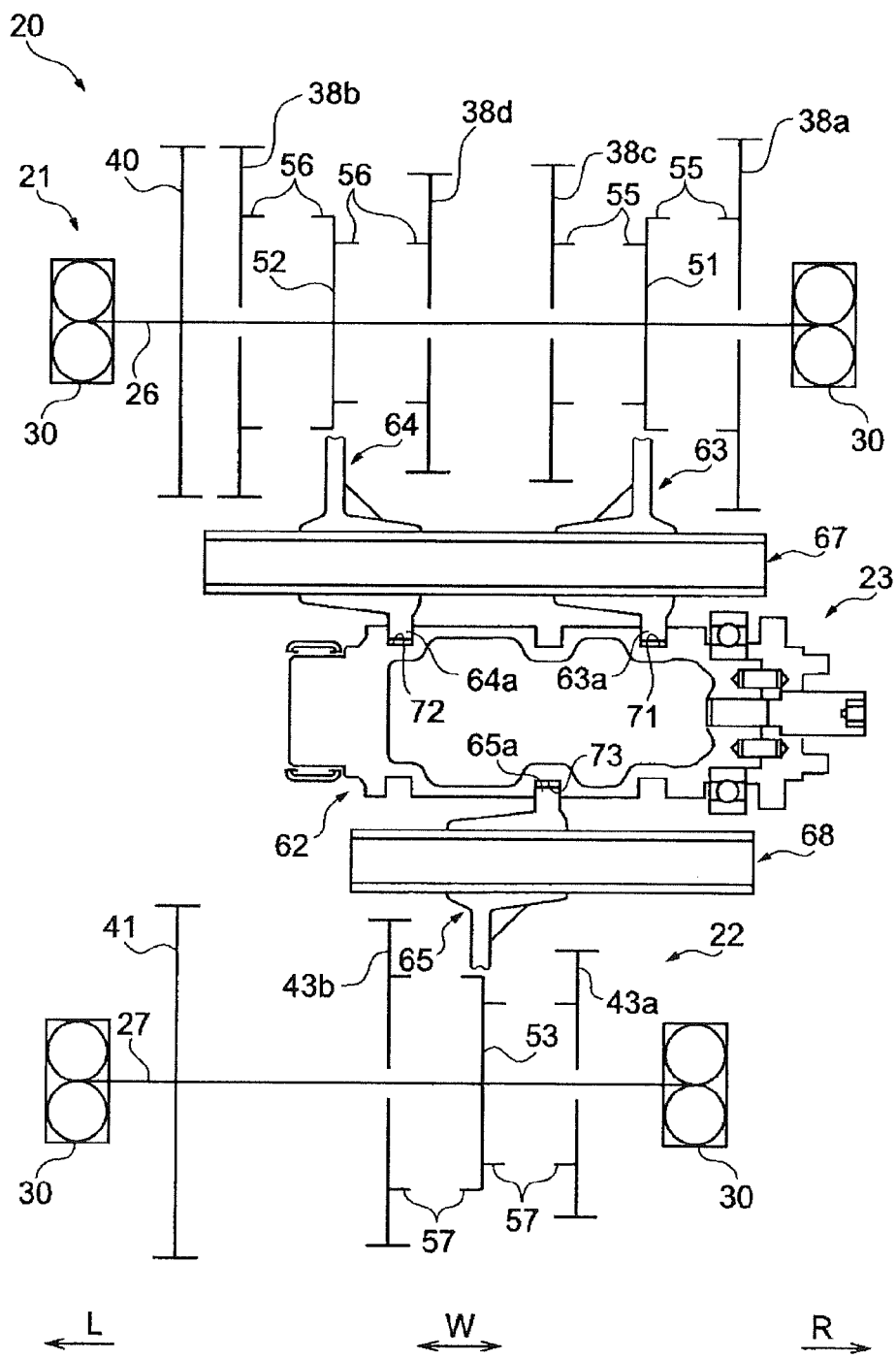
FIG. 4 A simplified sectional view cut along a plane passing through O3, O7, O6, O8 and O4 in FIG. 2.

Next, configuration of the shift mechanism 23 will be described with reference to FIGS. 1 to 4. FIG. 4 is a simplified sectional view cut along a plane passing through O3, O7, O6, O8 and O4 in FIG. 2. As shown in FIG. 1, the shift mechanism 23 has a shift pedal shaft 60, a shift drive plate 61, a shift cam 62, and a shift pedal arm (not shown). Also as shown in FIG. 2 and FIG. 4, the shift mechanism 23 further has first to third shift forks 63 to 65, and first and second shift shafts 67 and 68. In FIG. 1 and FIG. 2, the points O6 to O8 designate positions of shaft centers of the first shift shaft 67, the shift cam 62 and the second shift shaft 68.

The first and second shift shafts 67 and 68 are disposed respectively in parallel with the vehicle width direction. The first shift shaft 67 is provided in a position under the first drive shaft 26. The second shift shaft 68 is provided in a position under the second countershaft 27. The first and second shift forks 63 and 64 are attached to the first shift shaft 67 so as to be able to slide axially. The third shift fork 65 is attached to the second shift shaft 68 so as to be able to slide axially. Front ends of the first to third shift forks 63 to 65 (not shown in FIG. 4) are formed into bifurcated shapes so as to be engaged with the first to third slide dogs 51 to 53. The first to third shift forks 63 and 65 are provided with first to third pins 63a, 64a and 65a at their base portions. These pins 63a, 64a and 65a are received by first to third lead grooves 71 to 73 of the shift cam 62. The first to third lead grooves 71 to 73 will be described later.

The shift cam 62 is rotated and operated stepwise interlocking with a shift operation of the shift pedal arm (not shown) through the shift pedal shaft 60 and the shift drive plate 61. The shift cam 62 is disposed in parallel with the first drive shaft 26 and the second countershaft 27 and supported pivotally and rotatably near and under the shafts 26 and 27. The shaft cam 62 is a cylindrical cam which is, for example, cast into a hollow shape. The first to third lead grooves 71 to 73 are formed as three lead grooves in an outer circumferential surface of the shift cam 62. The first to third lead grooves 71 to 73 extend in a circumferential direction of the shift cam 62 and provided separately from one another in the axial direction of the shift cam 62. The first pin 63a is received by the first lead groove 71. The second pin 64a is received by the second lead groove 72. The third pin 65a is received slidably by the third lead groove 73.

Figure 5:
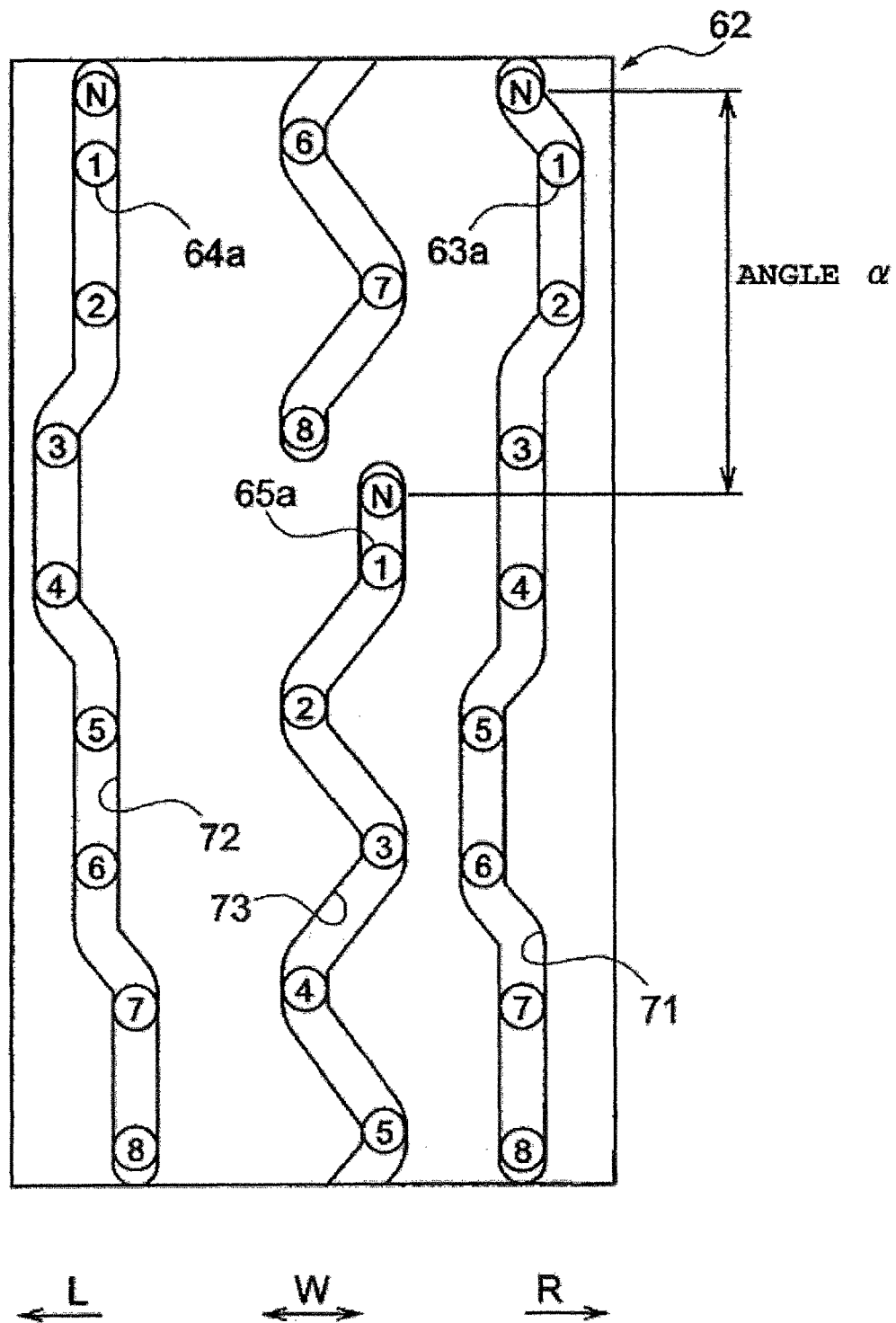
FIG. 5 A development view of an outer diameter of a shift cam.

FIG. 5 is a development view of the shift cam. Numerals on the surface of the shift cam 62 in FIG. 5 indicate positions of the respective pins 63a, 64a and 65a at the time of gear positions corresponding to the indicated numerals. With respect to the numerals (gear positions) inside the first and second lead grooves 71 and 72 in the circumferential direction (up/down direction in FIG. 5) of the shift cam 62, the numerals inside the third lead groove 73 are located in positions displaced downwards correspondingly to an angle α in FIG. 2. In the embodiment, Neutral N is positioned to be lower than a first speed in the embodiment.

Even when the shift cam 62 is rotated and operated to change speed from one gear position to another in a portion in which each lead groove 71 to 73 extends in parallel with the circumferential direction of the shift cam 62, the left/right position of each pin 63a, 64a, 65a is not changed. On the other hand, when the shift cam 62 is rotated and operated to change speed from one gear position to another in a portion in which each lead groove 71 to 73 extends to be inclined to the circumferential direction of the shift cam 62, the left/right position of each lead groove 71 to 73 is displaced in a position where each pin 63a, 64a, 65a is received. Accordingly, when the shift cam 62 is rotated by a predetermined rotation amount each time, the left/right positions of the respective lead grooves 71 to 73 are displaced to move the first to third shift forks 63 to 65 axially (in the left/right direction). Thus, the first to third slide dogs 51 to 53 engaged with the first to third shift forks 63 to 65 are selectively moved axially so that the respective gears to which the first to third slide dogs 51 to 53 are connected can be shifted. In addition, the respective gears to which the first to third slide dogs 51 to 53 are connected can be shifted simultaneously by rotation of the shift cam 62.

In the first lead groove 71, the axial position of the pin 63a is neutral at the time of Neutral (N), a third speed, a fourth speed, a seventh speed and an eighth speed. The first slide dog 51 is in non-contact with both the first output-side first speed gear 38a and the first output-side third speed gear 38c. Accordingly, both the first output-side first speed gear 38a and the first output-side third speed gear 38c run idle relatively to the first drive shaft 26. In the first lead groove 71, the axial position of the pin 63a is on the right side at the time of first and second speeds. The first slide dog 51 is connected to the first output-side first speed gear 38a through the dog clutches 55. Accordingly, a driving force is transmitted from the first countershaft 25 to the first drive shaft 26 through the first input-side first speed gear 37a and the first output-side first speed gear 38a. In the first lead groove 71, the axial position of the pin 63a is on the left side at the time of fifth and sixth speeds. The first slide dog 51 is connected to the first output-side third speed gear 38c through the dog clutches 55. Accordingly, a driving force is transmitted from the first countershaft 25 to the first drive shaft 26 through the first input-side third speed gear 37c and the first output-side third speed gear 38c.

In the second lead groove 72, the position of the pin 64a in the axial direction is neutral at the time of Neutral (N), the first speed, the second speed, the fifth speed and the sixth speed. The second slide dog 52 is in non-contact with both the first output-side fourth speed gear 38d and the first output-side second speed gear 38b. Accordingly, both the first output-side fourth speed gear 38d and the first output-side second speed gear 38b run idle relatively to the first drive shaft 26. In the second lead groove 72, the axial position of the pin 64a is on the left side at the time of the third and fourth speeds. The second slide dog 52 is connected to the first output-side second speed gear 38b through the dog clutches 56. Accordingly, a driving force is transmitted from the first countershaft 25 to the first drive shaft 26 through the first input-side second speed gear 37b and the first output-side second speed gear 38b. In the second lead groove 72, the axial position of the pin 64a is on the right side at the time of the seventh and eighth speeds. The second slide dog 52 is connected to the first output-side fourth speed gear 38d through the dog clutches 56. Accordingly, a driving force is transmitted from the first countershaft 25 to the first drive shaft 26 through the first input-side fourth speed gear 37d and the first output-side fourth speed gear 38d.

In the third lead groove 73, the axial position of the pin 65a is on the right side at the time of Neutral (N), the first speed, the third speed, the fifth speed and the seventh speed. The third slide dog 53 is connected to the second input-side first speed gear 43a through the dog clutches 57. Accordingly, a driving force is transmitted from the second countershaft 27 to the second drive shaft 28 through the second input-side first speed gear 43a and the second output-side first speed gear 44a. In the third lead groove 73, the axial position of the pin 65a is on the left side at the second, fourth, sixth and eighth speeds. The third side dog 53 is connected to the second input-side second speed gear 43b through the dog clutches 57. Accordingly, a driving force is transmitted from the second countershaft 27 to the second drive shaft 28 through the second input-side second speed gear 43b and the second output-side second speed gear 44b.

As described above, speed change using the respective gears is performed by the first to third lead grooves 71 to 73. In the speed change in the first transmission 21, as the stage number increases, the gears for transmitting the driving force are changed every two stages (whenever changing from an even-numbered stage to an odd-numbered stage) and a gear ratio gradually decreases. In addition, whenever the stage number is changed from an odd-numbered stage to an even-numbered stage in order to increase the stage number, or whenever the stage number is changed from an even-numbered stage to an odd-numbered stage in order to reduce the stage number, the gears for transmitting the driving force in the first transmission 21 are not changed. On the other hand, in the second transmission 22, the gears for transmitting the driving force are shifted whenever the stage number is changed by one. The gear ratio at an odd-number stage is smaller than that at an even-number stage. In the embodiment, the number of gear shift stages in the first transmission 21 is set at four and the number of gear shift stages in the second transmission 22 is set at two. The total number of gear shift stages in the transmission device 20 is the product of the two stage numbers (4×2=8). A total gear ratio of the transmission device 20 as to the gear ratios of the first and second transmissions 21 and 22 is shown in the following Table 1.

TABLE 1

|  | Gear Ratio of First Transmission | Gear Ratio of Second Transmission | Total Gear Ratio of Transmission Device |
| --- | --- | --- | --- |
| 1st Speed | A1 | B1 | A1 × B1 |
| 2nd Speed | A1 | B2 | A1 × B2 |
| 3rd Speed | A2 | B1 | A2 × B1 |
| 4th Speed | A2 | B2 | A2 × B2 |
| 5th Speed | A3 | B1 | A3 × B1 |
| 6th Speed | A3 | B2 | A3 × B2 |
| 7th Speed | A4 | B1 | A4 × B1 |
| 8th Speed | A4 | B2 | A4 × B2 |

In the gear ratios in Table 1, the gear ratios of the first and second transmissions 21 and 22 are set respectively so that the total gear ratio of the transmission device 20 can decrease when the gear ratio of the second transmission 22 increases from B2 to B1 with the increase of the stage number. Thus, the transmission device 20 can be provided with multi-stages ranging from the first speed to the eighth speed while the gear ratio of the transmission device 20 can be reduced gradually with the increase of the stage number.

Here, a transmission path of the driving force in the case where the gear position is changed from the fourth speed to the fifth speed among the gear positions of the first to eighth speeds will be described by way of example.

When the gear position is set at the fourth speed, the first slide dog 51 is in the neutral position due to the first lead groove 71 and the second slide dog 52 is positioned on the left side due to the second lead groove 72, as described above. In this state, the second slide dog 52 and the first output-side second speed gear 38b are connected to each other through the dog clutches 56 so that the first output-side second speed gear 38b and the first drive shaft 26 can be rotated integrally with each other. Thus, due to rotation of the first input-side second speed gear 37b, the first output-side second speed gear 38b engaged with the first input-side second speed gear 37b and the first drive shaft 26 are rotated so that a driving force can be transmitted from the first countershaft 25 to the first drive shaft 26 through these gears 37b and 38b. The driving force of the first drive shaft 26 is transmitted to the second countershaft 27 through the reduction drive gear 40 and the reduction driven gear 41 which are engaged with each other.

In addition, at the time of the fourth speed, the third slide dog 53 is positioned on the left side due to the third lead groove 73. In this state, the third slide dog 53 and the second input-side second speed gear 43b are connected to each other through the dog clutches 57 so that the second input-side second speed gear 43b and the second countershaft 27 can be rotated integrally with each other. Thus, due to the rotation of the second input-side second speed gear 43b, the second output-side second speed gear 44b engaged with the second input-side second speed gear 43b and the second drive shaft 28 are rotated so that a driving force can be transmitted from the second countershaft 27 to the second drive shaft 28 through these gears 43b and 44b. The driving force of the second drive shaft 28 is transmitted to the drive wheel (not shown) such as a rear wheel through the drive sprocket 46 and the drive chain 47.

When the gear position is changed from the fourth speed to the fifth speed, the first slide dog 51 is positioned on the left side due to the first lead groove 71 and the second slide dog 52 is in the neutral position due to the second lead groove 72. Accordingly, changeover is made such that the second slide dog 52 and the first output-side second speed gear 38b can be disconnected from each other and the first slide dog 51 and the first output-side third speed gear 38c can be connected to each other. That is, in the first transmission 21, the gears transmitting a driving force are changed over to the first output-side third speed gear 38c and the first input-side third speed gear 37c so that the driving force is transmitted from the first countershaft 25 to the first drive shaft 26 through these gears 37c and 38c.

In addition, at the time of the fifth speed, the third slide dog 53 is positioned on the right side due to the third lead groove 73. Accordingly, the subject to be connected to the third slide dog 53 is changed over so that the third slide dog 53 and the second input-side second gear 43b can be disconnected from each other and the third slide dog 53 and the second input-side first speed gear 43a can be connected to each other. That is, in the second transmission 22, the gears for transmitting a driving force are changed over to the second input-side first speed gear 43a and the second output-side first speed gear 44a so that the driving force can be transmitted from the second countershaft 27 to the second drive shaft 28 through these gears 43a and 44a.

According to the embodiment as described above, the number of gear shift stages can be increased and the axial lengths of the respective countershafts 25 and 27 and the respective drive shafts 26 and 28 can be shortened, for example, in comparison with a 6-speed transmission device which has a countershaft and a drive shaft each provided with six transmission gears. Thus, the distance between the bearings 30 supporting each of the shafts 25 to 28 can be shortened so that the strengths of the shafts 25 to 28 can be avoided from being deteriorated due to deflection deformation etc. Further, overhanging of the clutch mechanism 33 with respect to the engine center in the vehicle width direction or an offset amount of the drive chain 47 etc. can be reduced so that the mass of the transmission device 20 can be concentrated on the engine center. As a result, kinetic performance as a motorcycle can be improved.

In the embodiment, a plurality of lead grooves 71 to 73 are formed in one single shift cam 62 so that a plurality of slide dogs 51 to 53 can be displaced simultaneously and gear shift of the first and second transmissions 21 and 22 can be performed simultaneously by one single shift mechanism 23. Thus, complication of the configuration can be avoided and cost can be reduced in comparison with a configuration in which a shift mechanism is provided for each of the transmissions 21 and 22. Moreover, the gears of both the first and second transmissions 21 and 22 can be shifted simultaneously and operation can be also simplified.

In addition, the second transmission 22 has two shafts, i.e. the second countershaft 27 and the second drive shaft 28. Accordingly, the rotation direction of the drive sprocket 46 can be made the same as that for a background-art structure in which one transmission is provided. Thus, it is not necessary to add an extra shaft for changing the rotation direction. Accordingly, the configuration can be simplified.

The invention is not limited to the aforementioned embodiment, but may be carried out with various changes made thereon. In the aforementioned embodiment, the sizes, shapes, etc. illustrated in the accompanying drawings are not limited to the aforementioned ones but may be changed suitably within the range in which advantageous effects of the invention can be attained. The invention can be carried out with any other suitable change made thereon without departing from the scope of the object of the invention.

For example, the number of gear shift stages of each of the first and second transmissions 21 and 22 may be changed as long as the number of gear shift stages is plural. For example, the number of pairs of the second transmission gears of the second transmission 22 may be increased to four similarly to the first transmission 21 so that the total number of gear shift stages of the transmission device 20 can be set at 16 (=4×4).

In addition, the position of Neutral (N) in FIG. 5 is not limited but may be changed, for example, to a position between the first speed and the second speed.

In addition, the transmission mechanism for transmitting the driving force of the first drive shaft 26 to the second countershaft 27 can use another configuration as long as it can function similarly to the aforementioned reduction drive gear 40 and the aforementioned reduction driven gear 41.

INDUSTRIAL APPLICABILITY

As described above, the invention has an effect that the number of gear shift stages can be increased while the increase of the axial lengths of the shafts can be suppressed. Particularly, the invention is useful for a transmission device which is provided in an engine of a motorcycle.

The present application is based on a Japanese Patent Application No. 2014-081047 which was filed on Apr. 10, 2014 and contents of which are all included here in advance.

The invention claimed is:

1. A vehicle transmission device which transmits a driving force of a crankshaft from a first transmission to a drive wheel side through a second transmission, wherein:
the first transmission comprises a first input shaft to which the driving force from the crankshaft is transmitted, and a first output shaft to which the driving force of the first input shaft is transmitted through one of first transmission gears;
the second transmission comprises a second input shaft to which the driving force of the first output shaft is transmitted through a transmission mechanism, and a second output shaft to which the driving force of the second input shaft is transmitted through one of second transmission gears and which transmits the driving force to the drive wheel side;
the first and second transmissions are disposed side by side in a front/rear direction and each of the first and second transmissions is set to have a plurality of gear shift stages;
the first and second transmissions are provided with slide dogs respectively, and the slide dogs are selectively connected to one of the first transmission gears and one of the second transmission gears so that the driving force can be transmitted by the connected first and second transmission gears; and
a single shift mechanism is provided in a position adjacent to the first and second transmissions, and the shift mechanism is provided to be able to simultaneously shift the first and second transmission gears which transmit the driving force.

2. The vehicle transmission device according to claim 1, wherein:
the shift mechanism comprises a single shift cam in which a plurality of lead grooves are formed in its outer circumference and which is rotated to displace the respective lead grooves so that the first and second transmission gears to which the respective slide dogs are connected can be shifted due to the displacement.

3. The vehicle transmission device according to claim 1, wherein:
the first input shaft is disposed above the first output shaft, the second output shaft is disposed above the second input shaft, and the first input shaft and the second output shaft are disposed side by side in the front/rear direction.

4. The vehicle transmission device according to claim 1, wherein:
when the crankshaft, the first input shaft and the second output shaft are seen in their extension directions, center positions of the crankshaft, the first input shaft and the second output shaft are disposed along substantially the same straight line.

5. The vehicle transmission device according to claim 2, wherein:
the first input shaft is disposed above the first output shaft, the second output shaft is disposed above the second input shaft, and the first input shaft and the second output shaft are disposed side by side in the front/rear direction.

* * * * *